(12) United States Patent
Kim et al.

(10) Patent No.: US 12,374,252 B2
(45) Date of Patent: Jul. 29, 2025

(54) DEVICE FOR CONTROLLING RESOLUTION OF STRETCHABLE DISPLAY

(71) Applicant: UIF (University Industry Foundation), Yonsei University, Seoul (KR)

(72) Inventors: Hyun Jae Kim, Seoul (KR); Jong Bin An, Seoul (KR); Won Kyung Min, Seoul (KR); Gwan In Kim, Seoul (KR); Moon Ho Lee, Seoul (KR); Seok Gyu Hong, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 0 days.

(21) Appl. No.: 18/373,223

(22) Filed: Sep. 26, 2023

(65) Prior Publication Data

US 2024/0119878 A1 Apr. 11, 2024

(30) Foreign Application Priority Data

Oct. 5, 2022 (KR) .......................... 10-2022-0126889

(51) Int. Cl.
*G09G 3/00* (2006.01)
*G01L 5/10* (2020.01)

(52) U.S. Cl.
CPC ............... *G09G 3/035* (2020.08); *G01L 5/10* (2013.01); *G09G 2310/0297* (2013.01); *G09G 2340/0407* (2013.01)

(58) Field of Classification Search
CPC ... G09G 2310/0202; G09G 2310/0267; G09G 2310/0297
See application file for complete search history.

(56) References Cited

U.S. PATENT DOCUMENTS

| | | | | |
|---|---|---|---|---|
| 9,804,699 | B2 * | 10/2017 | Hyun | G06F 3/0487 |
| 2015/0085433 | A1 * | 3/2015 | Kim | G06F 1/1698 |
| | | | | 361/679.01 |
| 2016/0124536 | A1 * | 5/2016 | Hyun | G06F 3/0487 |
| | | | | 345/173 |
| 2019/0005884 | A1 * | 1/2019 | Yoo | G09G 3/3266 |

(Continued)

FOREIGN PATENT DOCUMENTS

| | | |
|---|---|---|
| KR | 10-2017-0107600 A | 9/2017 |
| KR | 10-2223680 B1 | 3/2021 |

(Continued)

OTHER PUBLICATIONS

Yongjun Lee, et al., "Morphable 3D structure for stretchable display", Materials Today, vol. 53, Mar. 2022, pp. 51-57.

*Primary Examiner* — Van N Chow
(74) *Attorney, Agent, or Firm* — Park, Kim & Suh, LLC

(57) ABSTRACT

A resolution controller for a stretchable display includes a resolution-setting multiplexer module to receive a resolution selecting signal and to apply a gate in panel (GIP) selecting signal, in response to the resolution selecting signal, and a GIP module configured to generate a gate driving signal in response to the GIP selecting signal applied by the resolution-setting multiplexer module, and apply the gate driving signal to a pixel driving flexible printed circuit board (FPCB) of the stretchable display to drive an open pixel depending on a stretched state of the stretchable display.

8 Claims, 10 Drawing Sheets

(56) References Cited

U.S. PATENT DOCUMENTS

| | | | | |
|---|---|---|---|---|
| 2019/0213943 | A1* | 7/2019 | Lee | G09G 3/2092 |
| 2021/0398491 | A1* | 12/2021 | Kwak | G09G 3/3266 |
| 2022/0223079 | A1* | 7/2022 | Kim | G09G 3/32 |
| 2023/0111507 | A1* | 4/2023 | Chuang | G09G 3/3688 |
| | | | | 345/213 |
| 2023/0326231 | A1* | 10/2023 | Derckx | G06V 40/1306 |
| | | | | 382/125 |
| 2023/0377365 | A1* | 11/2023 | Derckx | H03K 17/9622 |

FOREIGN PATENT DOCUMENTS

| | | | |
|---|---|---|---|
| KR | 10-2021-0158144 | A | 12/2021 |
| KR | 10-2022-0066803 | A | 5/2022 |
| KR | 10-2022-0095839 | A | 7/2022 |
| KR | 10-2022-0127393 | A | 9/2022 |

* cited by examiner

DEVICE FOR CONTROLLING RESOLUTION OF STRETCHABLE DISPLAY

CROSS-REFERENCE TO RELATED APPLICATIONS

This application claims priority under 35 U.S.C. § 119 to Korean Patent Application No. 10-2022-0126889 filed on Oct. 5, 2022, in the Korean Intellectual Property Office, the disclosures of which are incorporated by reference herein in their entireties.

BACKGROUND

Embodiments of the present disclosure described herein relate to a stretchable display, and more particularly, relate to a resolution controller of a stretchable display and a stretchable display device including the same.

Recently, flexible display devices, which are able to be folded or rolled, have been studied and developed, with the development of a display-related technology. In particular, researches and development on the stretchable display device, which is able to be variously changed in form, have been actively performed.

The stretchable display device is a display having the form which is stretched or released in whole size of the display. The stretchable display device includes a hidden pixel that needs to be driven when stretched. The hidden pixel is not required when a display device is released. However, a conventional stretchable display device is configured to have a hidden pixel applied with a driving signal and power even when released, in the same manner. Accordingly, the conventional stretchable display device may excessively consume power. Accordingly, there is required a resolution controller of a stretchable display to solve the problem of the excessive power consumption.

The present disclosure is derived from research conducted as part of the development of a nanomaterial technology by the Ministry of Science and ICT (MSIT; R&D) (Project No.; 1711157657, Project No.; 2020M3H4A1A02084896, Project management institution: Korea Research Foundation, Research project name; Biaxial Flexibility Sensitive AMLED Display Backplane Material/Device Technology, Task performing institution; Yonsei University, and Research Period: Jan. 1, 2022 to Dec. 31, 2022).

Meanwhile, there is no property interest of the Korean government in any aspect of the present disclosure.

SUMMARY

Embodiments of the present disclosure provide a resolution controller of a stretchable display, capable of implementing multiple resolutions.

According to an embodiment, a device for controlling a resolution of stretchable display may include a resolution-setting multiplexer module to receive a resolution selecting signal and to apply a gate in panel (GIP) selecting signal, in response to the resolution selecting signal, and a GIP module to generate a gate driving signal based on the GIP selecting signal applied by the resolution-setting multiplexer module, and apply the gate driving signal to a pixel driving flexible printed circuit board (FPCB) of the stretchable display to drive an open pixel depending on a stretched state of the stretchable display.

In this case, the resolution-setting multiplexer module may perform N×1 multiplexing to correspond to the number (N) of resolutions to be implemented in the stretchable display.

In this case, the device may further include a tensile sensor to generate the resolution selecting signal and transmit the resolution selecting signal to the resolution-setting multiplexer module.

In this case, the tensile sensor may sense tensile force applied to the stretchable display to sense a stretched degree or a released degree of the stretchable display, and generate a resolution selecting signal corresponding to the stretched degree or the released degree which is sensed.

In this case, the device may further include a D-IC module to generate a GIP start signal for driving the resolution-setting multiplexer module and apply the GIP start signal to the resolution-setting multiplexer module.

According to an embodiment, a stretchable display device may include a stretchable display configured to be stretched or released, and a resolution controller to control a resolution of the stretchable display, based on a stretched state of the stretchable display.

In this case, the stretchable display may include a plurality of pixels open or hidden depending on the stretched state of the stretchable display, and a pixel driving flexible printed circuit board (FPCB) to select and drive an open pixel depending on the stretched state under a control of the resolution controller.

In this case, the resolution controller may include a resolution-setting multiplexer module to receive a resolution selecting signal and to apply a gate in panel (GIP) selecting signal, in response to the resolution selecting signal, and a GIP module to generate a gate driving signal based on the GIP selecting signal applied by the resolution-setting multiplexer module, and apply the gate driving signal to the pixel driving flexible printed circuit board (FPCB) to select and drive the open pixel.

In this case, the resolution-setting multiplexer module may perform N×1 multiplexing to correspond to the number (N) of resolutions to be implemented in the stretchable display.

In this case, the resolution controller may further include a tensile sensor to generate the resolution selecting signal and transmit the resolution selecting signal to the resolution-setting multiplexer module.

In this case, the tensile sensor may sense tensile force applied to the stretchable display to sense a stretched degree or a released degree of the stretchable display, and select a resolution selecting signal corresponding to the stretched degree or the released degree which is sensed.

In this case, the resolution controller may further include a D-IC module to generate a GIP start signal for driving the resolution-setting multiplexer module and apply the GIP start signal to the resolution-setting multiplexer module.

BRIEF DESCRIPTION OF THE FIGURES

The above and other objects and features of the present disclosure will become apparent by describing in detail embodiments thereof with reference to the accompanying drawings.

DETAILED DESCRIPTION

The following embodiments are provided only for allowing those skilled in the art to apparently understand the spirit of the present disclosure, and the present disclosure is not limited to embodiments described in the present disclosure. The scope of the present disclosure is interpreted as including modifications or variations without departing from the spirit of the present disclosure.

Furthermore, the terminology used herein is used to properly express the embodiments of the present disclosure, and may be changed according to the intentions of the user or the manager or the custom in the field to which the inventive concept pertains. Otherwise, when specific terminology is used defined as an arbitrary meaning, the meaning will be described additionally. Accordingly, the terminology used in the present disclosure should be interpreted based on the real meaning of the terminology and the whole content of the present disclosure, instead of merely using the name of the terminology.

The accompanying drawings of the present disclosure are provided to easily describe the present disclosure. The shape illustrated in the accompanying drawings may be exaggerated if necessary to help the understanding of the present disclosure. Accordingly, the present disclosure is not limited to the drawings.

In the following description of the present disclosure, in the case where it is determined that the detailed description of a related known configuration or function may make the subject matter of the present disclosure unclear, the details thereof may be omitted.

Figure 1:
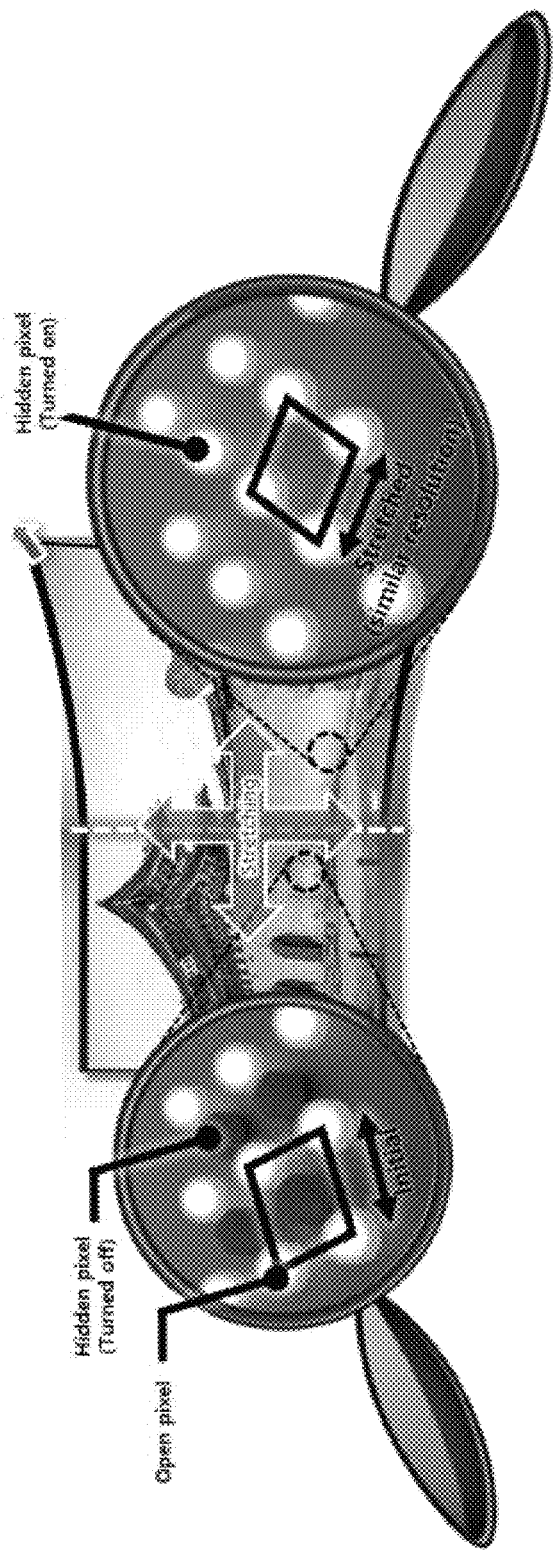
FIG. 1 is a schematic view illustrating a stretchable display device stretched/reduced.

FIG. 1 is a schematic view illustrating a stretchable display device stretched/released, according to an embodiment of the present disclosure.

Referring to FIG. 1, when the stretchable display is stretched, a pixel driving signal is applied to all of an open pixel and a hidden pixel. The stretchable display may be configured such that the pixel driving signal is applied to only the open pixel rather than the hidden pixel, when the stretchable display is released. Accordingly, according to the present disclosure, a controller may prevent power consumption of an unnecessary pixel to correspond to the stretchable display stretched/released and the resolution of the stretchable display.

Figure 2:
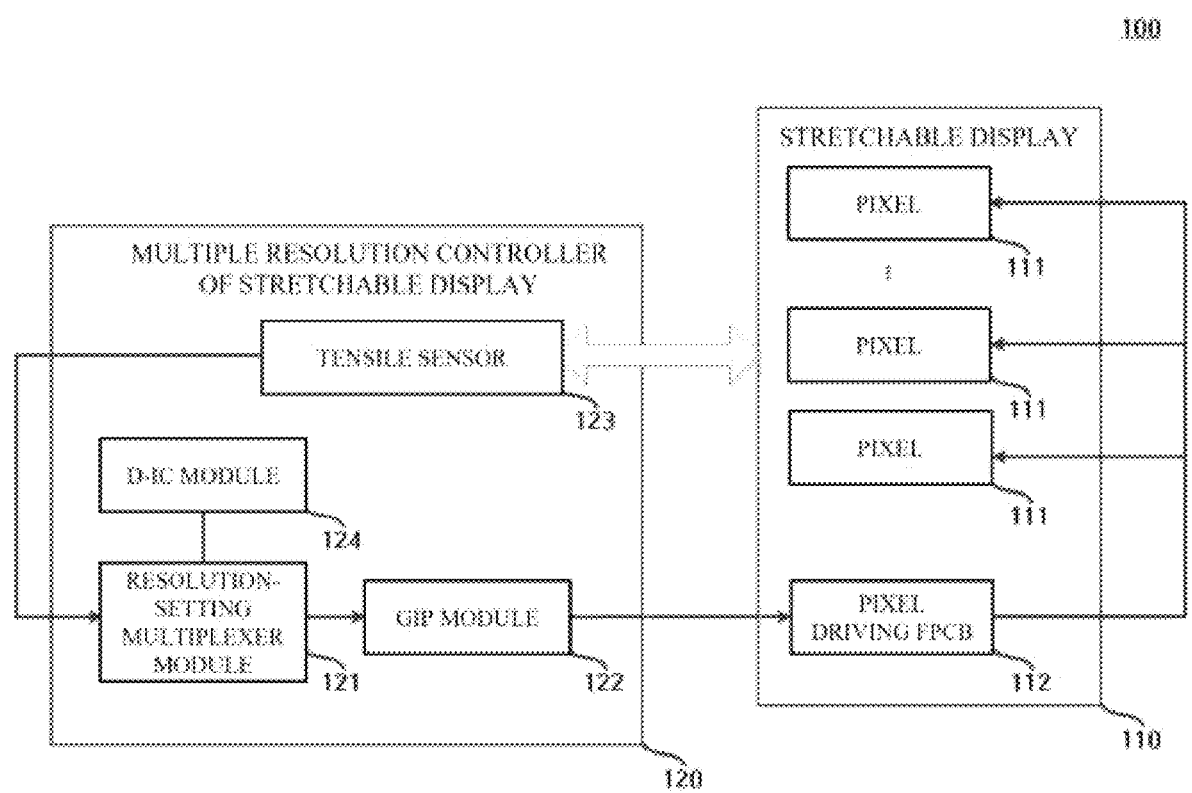
FIG. 2 is a block diagram illustrating a stretchable display device, according to an embodiment of the present disclosure.

FIG. 2 is a block diagram illustrating a stretchable display device, according to an embodiment of the present disclosure.

Referring to FIG. 2, according to an embodiment of the present disclosure, the stretchable display device 100 may be configured to include a stretchable display 110, and a resolution controller 120 of the stretchable display.

The stretchable display 110 may be configured to be stretched or released. The stretchable display may be configured to include a pixel 111, and a pixel driving flexible printed circuit board (FPCB) 112.

The pixel 111 may be configured to be open or hidden, as the stretchable display 110 is stretched/released. The resolution of the stretchable display 110 may be varied depending on the stretchable display 110 stretched or released.

The pixel driving FPCB 112 may be configured such that the exposure pixel is selected and driven under the control of the resolution controller 120 of the stretchable display 110.

The resolution controller 120 of the stretchable display 110 may be configured to automatically control the resolution of the stretchable display 110 to correspond to the stretchable display 110 stretched/released. At least two types of stretched/released states may be provided, and the resolution may be set to correspond to each stretched/released state.

The resolution controller 120 of the stretchable display 110 may be configured to include a resolution-setting multiplexer module 121, a gate in panel (GIP) module 122, a tensile sensor 123, and a driver-integrated circuit module 124.

The resolution-setting multiplexer module 121 may be configured to receive a resolution selecting signal from the tensile sensor 123, and apply a GIP selecting signal to the GIP module 122 in response to the received resolution selecting signal. In this case, the tensile sensor 123 may be configured to sense the stretched/released state, as the stretchable display 110 senses tensile force. The resolution selecting signal may be generated from the tensile sensor 123, depending on the stretched/released state sensed by the tensile sensor 123.

The resolution-setting multiplexer module 121 may be configured to perform N×1 multiplexing to correspond to the number of resolutions to be implemented. When the stretchable display 110 has two types of stretched/released states, two resolutions may be provided. When the stretchable display 110 has three types of stretched/released states, three resolutions may be provided.

The GIP module 122 may be configured to generate a gate driving signal in response to the GIP selecting signal applied by the resolution-setting multiplexer module 121. The gate driving signal may be used to drive a pixel selected in response to a pixel driving signal. The GIP module 122 may be configured to drive the open pixel depending on the stretched/released state of the stretchable display 110 by applying the gate driving signal to the pixel driving FPCB 112 of the stretchable display 110.

The tensile sensor 123 may be configured to generate the resolution selecting signal and transmit the resolution selecting signal to the resolution-setting multiplexer module 121. The tensile sensor 123 may be configured to sense the tensile force in the stretchable display 110, to sense the stretched or released degree of the stretchable display 110, and to select a resolution selecting signal corresponding to the stretched/released degree which is sensed.

The D-IC module 124 may be configured to generate a GIP start signal to drive a series of resolution-setting multiplexer modules 121 and apply the GIP start signal to the resolution-setting multiplexer module 121.

According to an embodiment, when the stretchable display 110 implements two resolutions, the tensile sensor 123 may generate the resolution selecting signal based on the tensile force applied to the stretchable display 110. For example, when the tensile sensor 123 selects the resolution of "B", based on the tensile force, the tensile sensor 123 may output the resolution selecting signal as '0'. For example, when the tensile sensor 123 selects the resolution of "A", based on the tensile force, the tensile sensor 123 may output the resolution selecting signal as '1'.

The D-IC module 124 may change a target for transmitting the GIP start signal, depending on the value of the resolution selecting signal. For example, when the value of the resolution selecting signal is '0', the D-IC module 124 may transmit the GIP start signal only to the even-numbered line of the resolution-setting multiplexer module 121. Accordingly, the GIP may output only through the even-numbered line. For another example, when the value of the resolution selecting signal is '1', the D-IC module 124 may transmit the GIP start signal to all lines of the resolution-setting multiplexer module 121. Accordingly, the GIP can be output through the all lines. It may be recognized that the stretchable display is stretched.

Figure 3:
FIG. 3 is a view illustrating three types of resolutions, according to an embodiment of the present disclosure.
Figure 3:
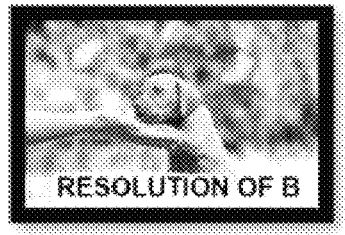
Figure 3:

FIG. 3 is a view illustrating three types of resolutions, according to an embodiment of the present disclosure.

FIG. 3 illustrates that the resolution of "A", the resolution of "B", or the resolution "C" may be set depending on three types of stretched/released states of the stretchable display 110.

Figure 4:
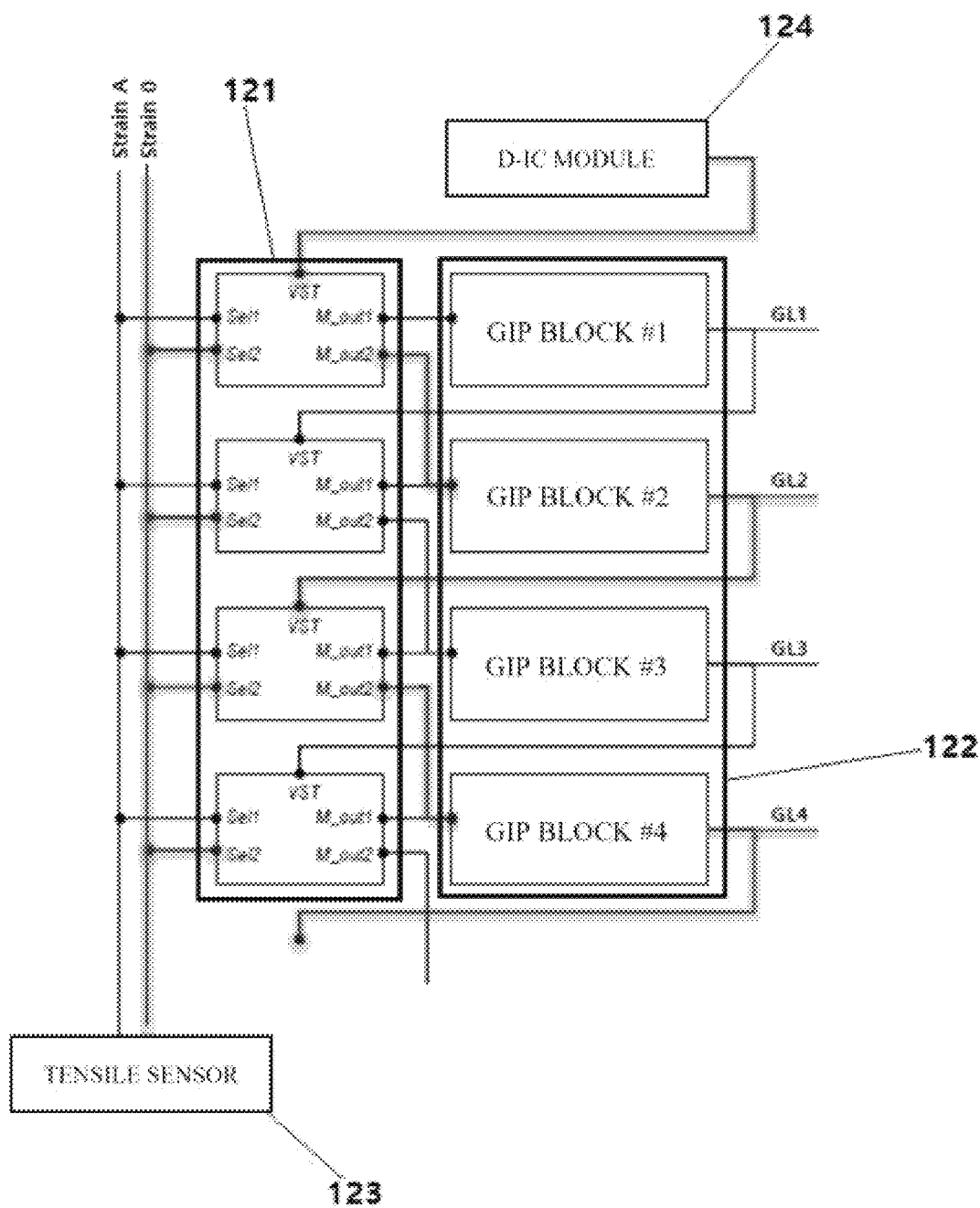
FIGS. 4 and 5 are block diagrams illustrating a resolution controller of a stretchable display for setting two types of resolutions, according to an embodiment of the present disclosure.
Figure 5:
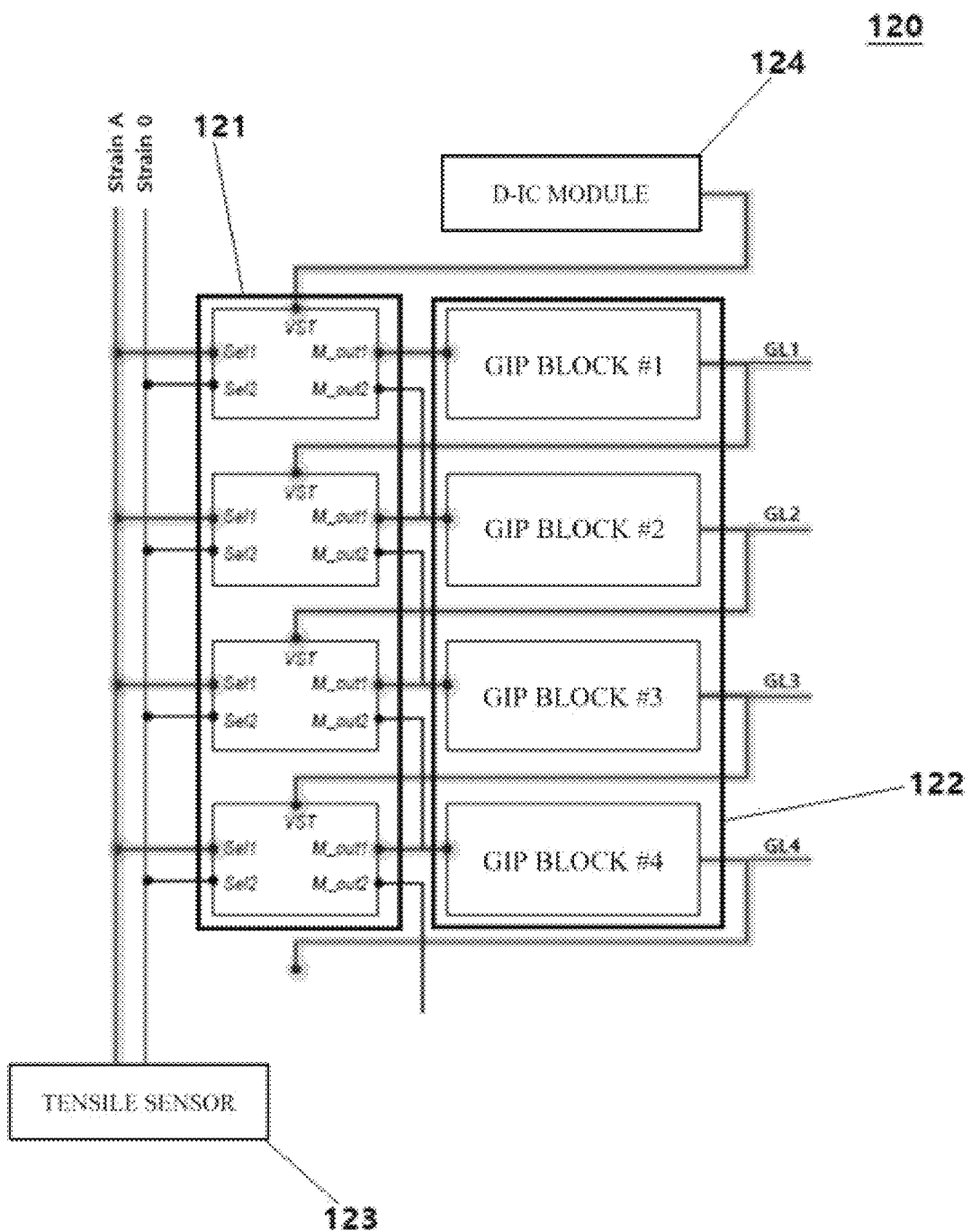

FIGS. 4 and 5 are block diagrams illustrating the resolution controller of the stretchable display for setting two types of resolutions, according to an embodiment of the present disclosure.

FIGS. 4 and 5 illustrate that the stretchable display 110 has two types of stretched/released states, and the resolution controller 120 of the stretchable display 110 controls the stretchable display 110 to be driven with the resolution of "A" or the resolution of "B".

FIG. 4 illustrates the operation of controlling the driving with the resolution of "A" and FIG. 5 illustrates the operation of controlling the driving with the resolution of "B".

As illustrated in FIGS. 4 and 5, the resolution-setting multiplexer module 121 may be configured to include a plurality of multiplexers MUX, and the GIP module 122 may be configured to include GIP blocks provided in number corresponding to the number of the multiplexers MUX.

In this case, when the number of the stretched/released states of the stretchable display 110 is "N", the input/output terminals of the multiplexer may be configured to "N×1". FIGS. 4 and 5 illustrate the 2×1 input/output configuration.

Each multiplexer in FIGS. 4 and 5 may be configured to selectively drive the GIP block by receiving a resolution selecting signal from Strain 0, Strain A, and Strain B and outputting a "Mux Out" signal for selecting the GIP block. In this case, the GIP block selected and driven may output a "GIP out" signal for driving the open pixel.

The following table 1 shows a signal state of each component with respect to the resolution of "A".

TABLE 1

| Classification | | Strain 0 |
| --- | --- | --- |
| Control signal | Sel1 | 0 |
| | Sel2 | 1 |
| Mux Out | M_out1 | 0 |
| | M_out2 | 1 |
| GIP out | GL1 | 0 |
| | GL2 | 1 |
| | GL3 | 0 |
| | GL4 | 1 |

The resolution of "A" is a resolution when the stretchable display 110 is released. In case of resolution of "A", referring to table 1, as "GL1" and "GL3" of the GIP out signal are output as '0', the gate driving signal is not applied to the relevant hidden pixel. In other words, power consumption will be reduced.

Figure 6:
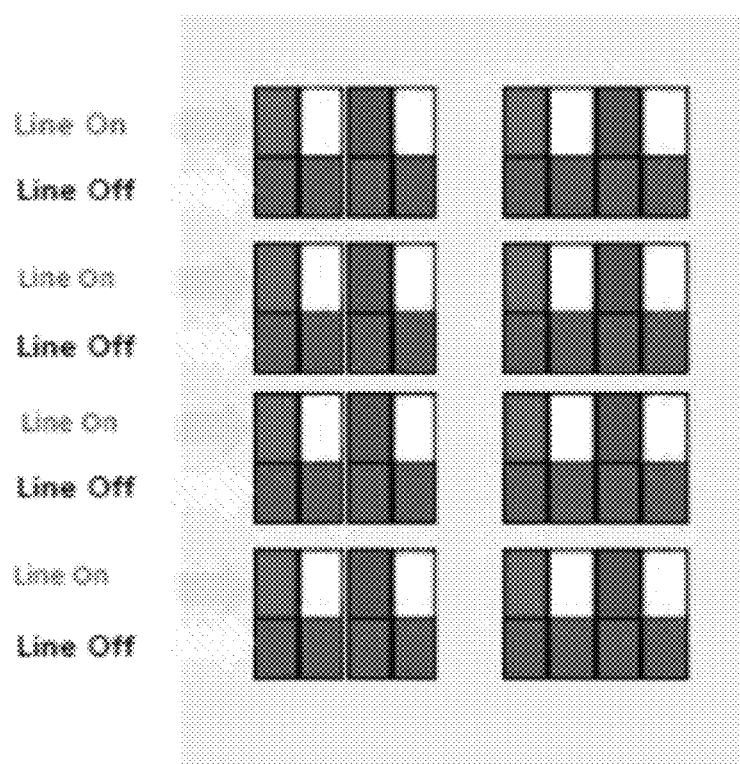
FIGS. 6 and 7 are schematic views illustrating a pixel driving state for setting two types of resolutions, according to an embodiment of the present disclosure.
Figure 7:
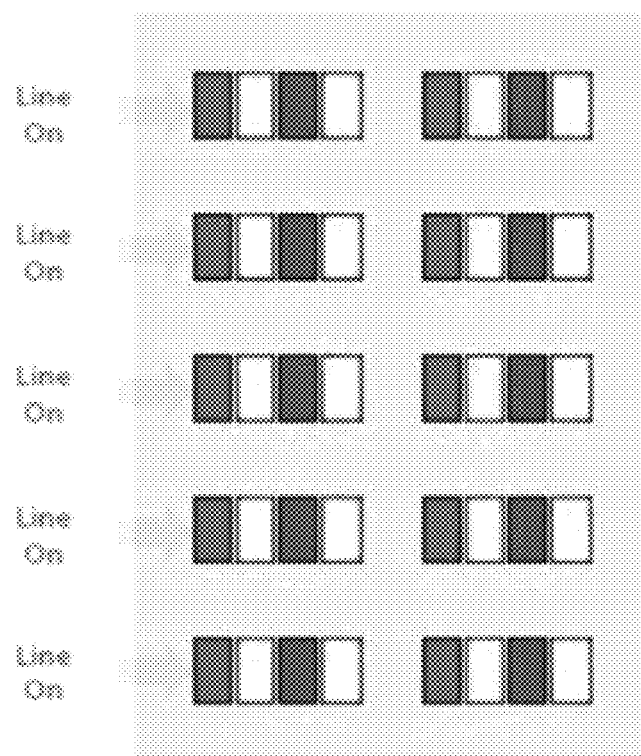

FIGS. 6 and 7 are schematic views illustrating a pixel driving state for setting two types of resolutions, according to an embodiment of the present disclosure.

FIG. 6 illustrates the open pixel and the hidden pixel based on the gate driving signal.

The following table 2 shows a signal state of each component with respect to the resolution of "B".

TABLE 2

| Classification | | Strain 0 | Strain A |
| --- | --- | --- | --- |
| Control signal | Sel1 | 0 | 1 |
| | Sel2 | 1 | 0 |
| Mux Out | M_out1 | 0 | 1 |
| | M_out2 | 1 | 0 |
| GIP out | GL1 | 0 | 1 |
| | GL2 | 1 | 1 |
| | GL3 | 0 | 1 |
| | GL4 | 1 | 1 |

The resolution of "B" is a resolution when the stretchable display 110 is stretched, and indicates that all pixels are open such that all gate driving signals GL1, GL2, GL3, and GL4 are output. FIG. 7 illustrates that all pixels are open in response to the gate driving signal.

Figure 8:
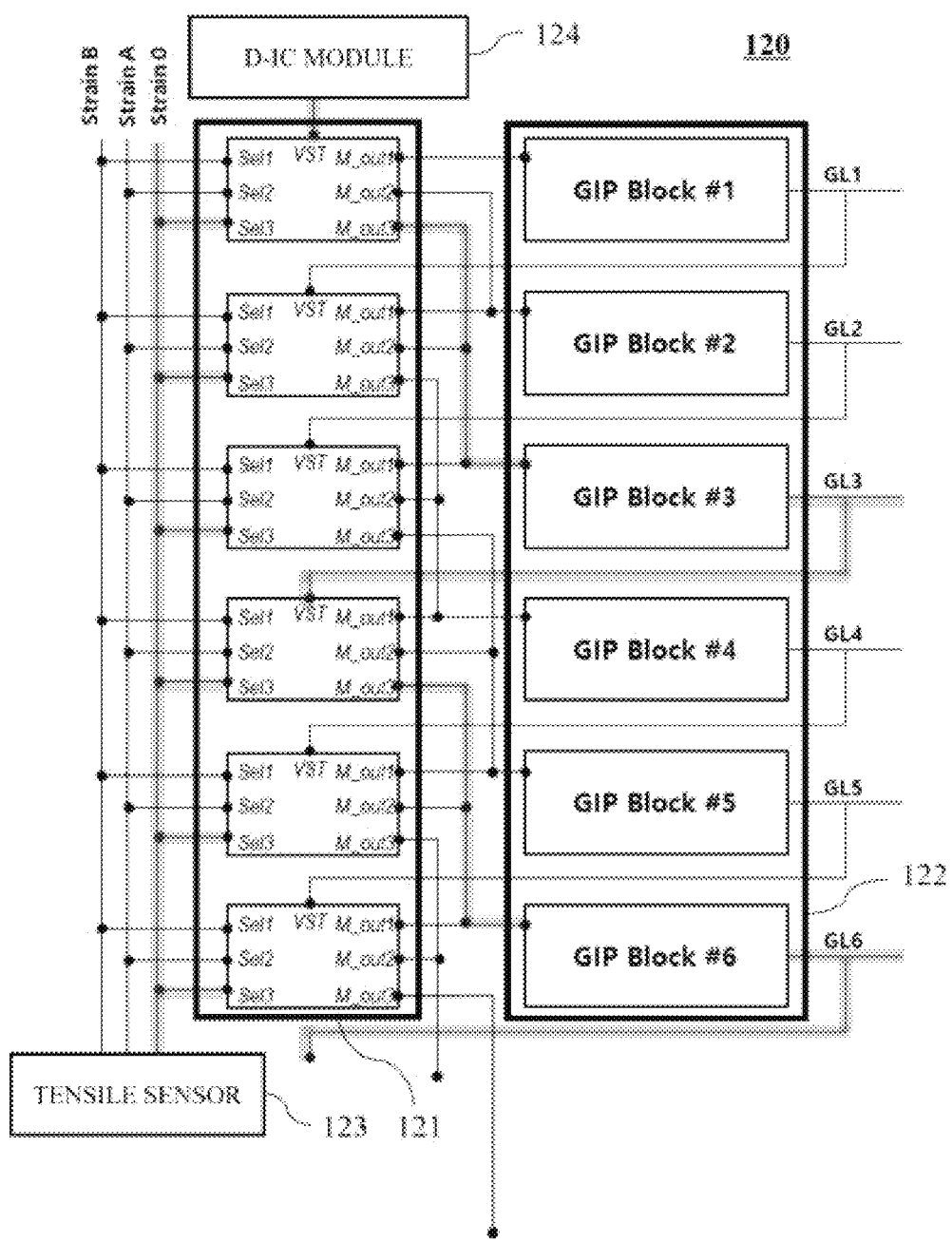
FIGS. 8 to 10 are block diagrams illustrating a resolution controller of a stretchable display for setting three types of resolutions, according to another embodiment of the present disclosure.
Figure 9:
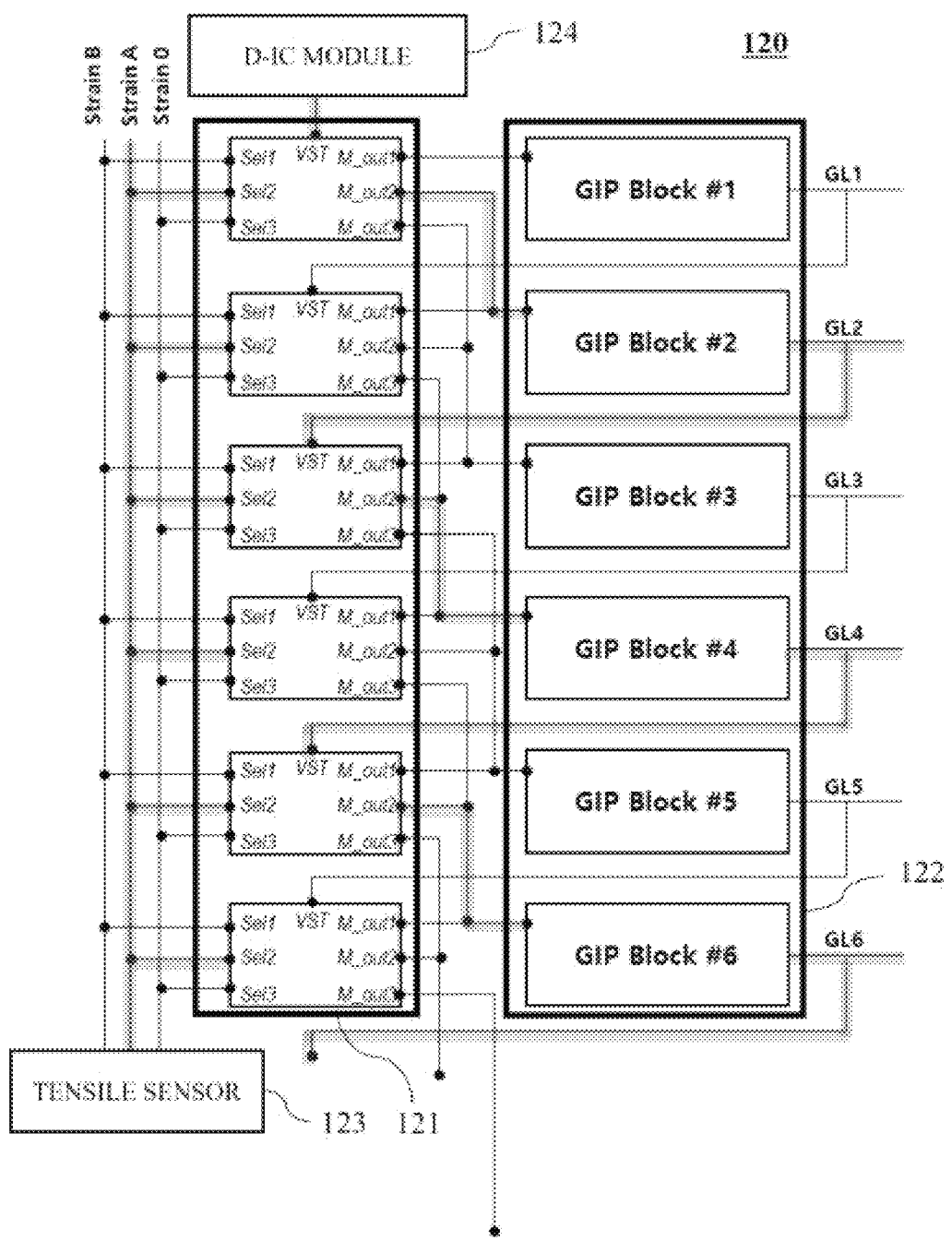
Figure 10:
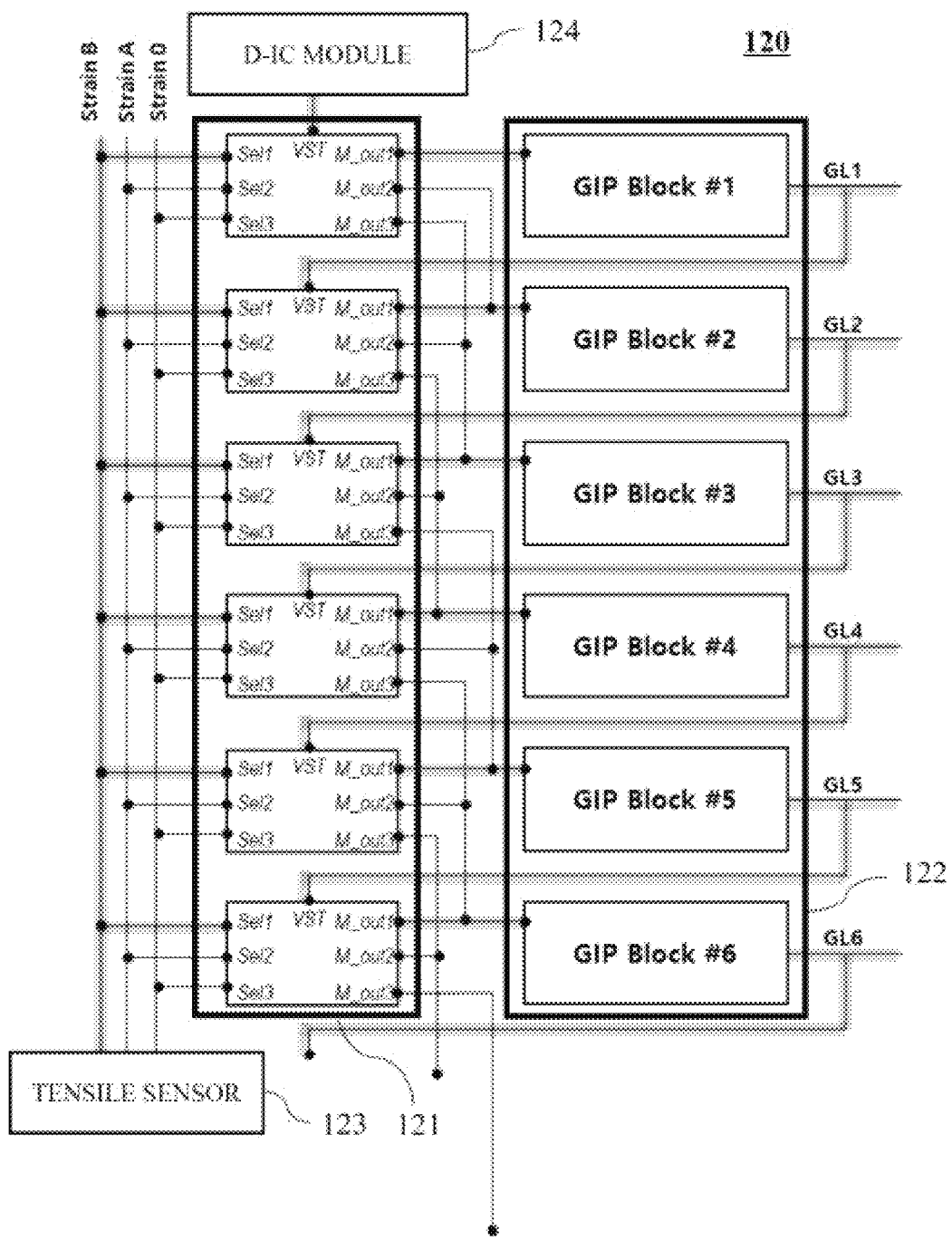

FIGS. 8 to 10 are block diagrams illustrating the resolution controller of the stretchable display for setting three types of resolutions, according to another embodiment of the present disclosure.

Referring to FIGS. 8 to 10, the resolution-setting multiplexer module 121 includes 3×1 multiplexers. The GIP module 122 includes GIP blocks provided in number corresponding to the number of multiplexers.

FIG. 8 illustrates the driving operation with respect to the resolution of "A", FIG. 9 illustrates the driving operation with respect to the resolution of "B", and FIG. 10 illustrates the driving operation with respect to the resolution of "C". As illustrated in FIG. 8, the gate driving signals GL3 and GL6 of the GIP out signals are output, such that the relevant open pixels are turned on. As illustrated in FIG. 9, the gate driving signals GL2, GL4, and GL6 of the GIP out signals are output, such that the relevant open pixels are turned on. As illustrated in FIG. 10, the gate driving signals GL1, GL2, GL3, GL4, GL5, and GI6 of the GIP out signals are output, such that the relevant open pixels are turned on.

Meanwhile, the resolution controller 120 of the stretchable display 110 may be configured to set resolutions in number larger than the number of the stretched/released states of the stretchable display 110. To reduce power consumption, only some pixels are selected from the open pixels such that the resolution is reduced.

The method according to an embodiment may be implemented in the form of a program instruction and may be recorded in a computer-readable recording medium. The computer-readable recording medium may include a single program instruction, a single data file, or a single data structure or the combination thereof. The program instruction recorded in the medium is particularly designed and configured for an embodiment, or well known by those skilled in the art and used. Examples of computer-readable recording media include magnetic media, such as a hard disk, a floppy disk, and a magnetic tape, optical media, such as a CD-ROM, or a DVD, magnetic-optical media, such as a floppy disk, and a hardware device, such as a ROM, a RAM, a flash memory, that is specially configured to store and execute a program instruction. In addition the program may include not only a mechanical code such as things generated by a compiler but also a high-level language code executable on a computer using an interpreter. The hardware device may be configured to operate as at least one software module to perform the operation of an embodiment, and vice versa.

According to an embodiment of the present disclosure, the resolution controller for the stretchable display capable of implementing multiple resolutions may be provided.

Hereinabove, although the inventive concept has been described with reference to embodiments and the accompanying drawings, the inventive concept is not limited thereto, but may be variously modified and altered by those skilled in the art to which the inventive concept pertains without departing from the spirit and scope of the disclosure claimed in the following claims. For example, a proper result may be achieved even though the above description is reproduced in order different from that of the describe method, or the above-described components, such as a system, a structure, a device, or a circuit, are combined or aggregated in the form different from the described form, or are substituted or replaced to other components or equivalents.

Therefore, other implementations, other embodiments, and equivalents of claims belong to the scope of the following claims.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A device for controlling a resolution of a stretchable display, the device comprising:
   a resolution-setting multiplexer module configured to receive a resolution selecting signal and to apply a gate in panel (GIP) selecting signal in response to the resolution selecting signal; and
   a GIP module configured to generate a gate driving signal based on the GIP selecting signal applied by the resolution-setting multiplexer module, and apply the gate driving signal to a pixel driving flexible printed circuit board (FPCB) of the stretchable display to drive an open pixel depending on a stretched state of the stretchable display,
   wherein the resolution-setting multiplexer module includes:
      a plurality of multiplexers each of which performs N×1 multiplexing, wherein N is a number of resolutions implemented in the stretchable display and a total number of the plurality of multiplexers is 2*N,
   wherein the GIP module includes:
      a plurality of GIP blocks connected to the plurality of multiplexers, respectively, wherein a total number of the plurality of GIP blocks is 2*N and each multiplexer selectively drives a corresponding GIP block.

2. The device of claim 1, further comprising:
   a tensile sensor configured to generate the resolution selecting signal and transmit the resolution selecting signal to the resolution-setting multiplexer module.

3. The device of claim 2, wherein the tensile sensor is configured to:
   sense tensile force applied to the stretchable display to sense a stretched degree or a released degree of the stretchable display, and generate a resolution selecting signal corresponding to the stretched degree or the released degree which is sensed.

4. The device of claim 1, further comprising:
   a D-IC module configured to generate a GIP start signal for driving the resolution-setting multiplexer module and apply the GIP start signal to the resolution-setting multiplexer module.

5. A stretchable display device comprising:
   a stretchable display configured to be stretched or released; and
   a resolution controller configured to control a resolution of the stretchable display based on a stretched state of the stretchable display,
   wherein the stretchable display includes:
      a plurality of pixels configured to be open or hidden depending on the stretched state of the stretchable display; and
      a pixel driving flexible printed circuit board (FPCB) to select and drive an open pixel depending on the stretched state under a control of the resolution controller,
   wherein the resolution controller includes:
      a resolution-setting multiplexer module configured to receive a resolution selecting signal and to apply a gate in panel (GIP) selecting signal, in response to the resolution selecting signal; and
      a GIP module configured to generate a gate driving signal based on the GIP selecting signal applied by the resolution-setting multiplexer module, and apply the gate driving signal to the pixel driving flexible printed circuit board (FPCB) to select and drive the open pixel,
   wherein the resolution-setting multiplexer module includes:
      a plurality of multiplexers each of which performs N×1 multiplexing, wherein N is a number of resolutions implemented in the stretchable display and a total number of the plurality of multiplexers is 2*N,
   wherein the GIP module includes:
      a plurality of GIP blocks connected to the plurality of multiplexers, respectively, wherein a total number of the plurality of GIP blocks is 2*N and each multiplexer selectively drives a corresponding GIP block.

6. The device of claim 5, wherein the resolution controller further includes:
   a tensile sensor configured to generate the resolution selecting signal and transmit the resolution selecting signal to the resolution-setting multiplexer module.

7. The device of claim 6, wherein the tensile sensor is configured to:
   sense tensile force applied to the stretchable display to sense a stretched degree or a released degree of the stretchable display, and select a resolution selecting signal corresponding to the stretched degree or the released degree which is sensed.

8. The device of claim 5, wherein the resolution controller further includes:
   a D-IC module configured to generate a GIP start signal for driving the resolution-setting multiplexer module and apply the GIP start signal to the resolution-setting multiplexer module.

* * * * *